Aug. 15, 1950     W. E. ANDERSON     2,518,514
MATERIAL FEEDER
Filed July 29, 1946

INVENTOR.
William E. Anderson
BY
ATTORNEY

Patented Aug. 15, 1950

2,518,514

UNITED STATES PATENT OFFICE 2,518,514

MATERIAL FEEDER

William E. Anderson, Kansas City, Mo., assignor of one-half to William Earl Anderson, Blue Springs, Mo.

Application July 29, 1946, Serial No. 686,937

1 Claim. (Cl. 302—52)

This invention relates to material feeders and more specifically to feeders particularly adapted to feed ingredients for making building blocks wherein said blocks are formed by directing the mixture of sand, cement and water under pressure against a form or block mold. The primary object of this invention is to provide a material feeder having a hopper formed to direct the material toward a conduit passing therethrough, which conduit is provided with a plurality of ports for admission of the material into a stream of air under pressure passing through the conduit.

Another object of this invention is to provide a material feeder having a hopper and a conduit for receiving material from the hopper provided with a series of ports disposed in spaced apart, staggered relation in the conduit, each formed to present both a radially directed opening and an opening facing the direction of travel of a stream of pressurized air created in the conduit.

A still further object of this invention is the provision of a material feeder having a hopper and a conduit therethrough of the aforementioned character wherein each port is formed by stamping the conduit to present an internal lip inclined in the direction of travel of material in the conduit whereby a number of high pressure zones is established as air under pressure is caused to flow through the conduit.

Other objects of this invention include a material feeder that obviates clogging and jamming of material passing from the point of storage to points of use; that assures a constant and even flow of material with a minimum of working parts; that is unlikely to get out of order during long periods of continued use; and a material feeder that is simple to construct, inexpensive to manufacture, and easy to operate.

Additional objects will become apparent throughout the following specification, referring to the accompanying drawing wherein.

Figure 1:
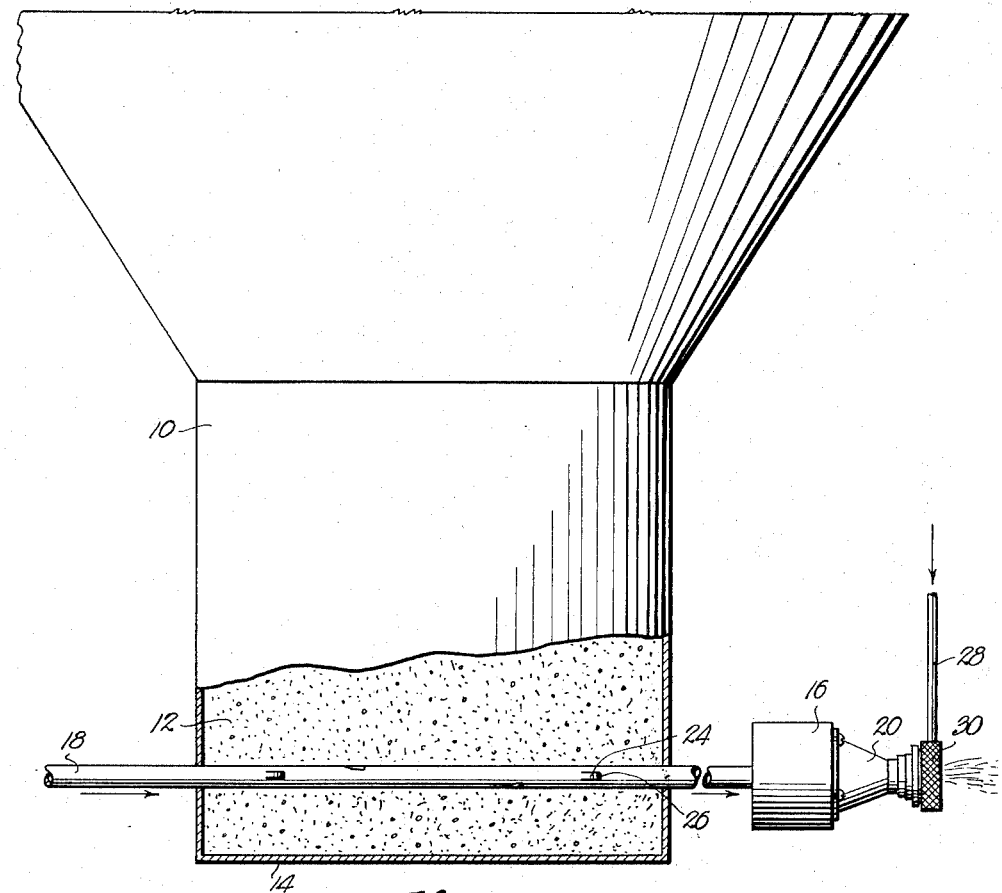
Figure 1 is a side elevational view of a material feeder made in accordance with my present invention, parts being broken away to reveal details of construction.

The hopper for containing the ingredients to be fed by the structure shown in Fig. 1 is broadly designated by the numeral 10, and is formed in the conventional funnel-like manner to direct the material 12 toward the bottom 14 thereof. Obviously this form can be varied to suit conditions by varying the slope of the side walls or changing the contour to assure the steady flow of material 12 by the action of gravity toward the bottom 14.

The material 12 is contemplated to include a mixture of predetermined portions of sand and cement plus any other comminuted ingredients desired or necessary in forming concrete building blocks. The process for forming the completed blocks include structure not here shown, but for purposes of explanation, the form or mold around which the block is shaped is moved by an endless belt or otherwise positioned in line to receive a blast of the wet cement and so aligned with the means for creating such blast as to form all sides of the block until a finished block is made.

The structure for establishing such action upon the material likewise is no part of this invention but is illustrated in Fig. 1 without showing details of construction. This structure includes a motor and a fan driven thereby, both of which are mounted within a housing 16. The said fan is formed in such manner as to establish a suction of air through a conduit 18 when it is rotated by the motor in the housing 16. One end of the conduit 18 passes through the housing 16 into communication with conical portion 20 fixed to the housing 16 while the opposite end thereof is in communication with the atmosphere.

Figure 2:
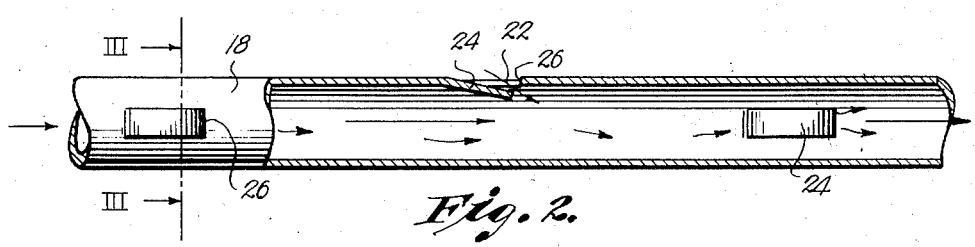
Fig. 2 is an enlarged, fragmentary view of the conduit shown in Fig. 1, parts being broken away to illustrate the manner of forming the openings therein.

This conduit 18 passes through the hopper 10 near the bottom wall 14 thereof and is provided with a plurality of ports 22 throughout the length thereof disposed within the hopper 10. These ports 22 are formed by cutting a relatively narrow lip 24 and bending the same inwardly into the conduit 18 until the uppermost face thereof is on an incline with respect to the longitudinal axis of the conduit 18. This inclination of the lip 24 is such as to permit the flow of material 12 from the hopper 10 in the general direction of flow of air in the conduit 18, all as illustrated by arrows in Fig. 2.

The lips 24 are bent into the conduit 18 a distance not only to form an opening in the ports 22 which faces the direction of flow of air in the conduit 18, but also to present an opening directed radially into the conduit 18. In other words, the lip 24 extends below the outermost surface of the conduit 18 a distance sufficient to present a space between the free end of the lip 24 and the wall 26 of the conduit 18 forming the port 22. Thus, suction created by the fan within the housing 16 will not only draw the material 12 radially inwardly into the conduit 18 with the aid of gravitational movement of the material 12, but will draw the material inwardly along the outermost surface of the lips 24 as it slides therealong by the action of gravity.

Figure 3:
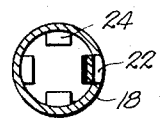
Fig. 3 is a cross sectional view taken on line III—III of Fig. 2.

The ports 22 are disposed in spaced-apart, staggered relation in conduit 18 and will vary in size and numbers in accordance with the fineness of the material 12. Fig. 3 illustrates the way the lips 24 extend into the conduit 18 and illustrates how a series of relatively high pressure zones is created within the conduit 18. The cross-sectional area of the conduit 18 is less at points adjacent each of the lips 24 which assures the movement of the material into the portion 20 with a minimum of force. The formation of the ports 22 as just described virtually eliminates clogging or gumming of material in these ports or in the conduit 18, particularly since the material remains dry until it reaches a point of discharge. Liquid is introduced through a pipe 28 and a specially formed head 30, the details of which form no part of this invention, causes the fluid to be directed upon the material 12 after the same passes from the head 30 toward the aforementioned mold, designed to present a block having predetermined forms and contours.

Manifestly, material feeders may be made by altering specific details of construction without departing from the objects of the present invention or scope of the appended claim.

Having thus described the invention, what is claimed as new and desired to be secured by Letters Patent is:

In a material feeder, a hopper for the material to be fed; a conduit traversing the hopper near the bottom thereof and embedded in said material; means for forcing a stream of air under pressure through the conduit in one direction; and a series of ports formed in the conduit throughout the length of that portion thereof within the material, said ports each having a radially directed opening, and an opening facing the direction of movement of the material, said ports being in spaced-apart relation and staggered around the conduit whereby to feed material from the hopper into the stream of air under pressure from substantially all points thereof on its periphery, and each including an inclined, elongated lip integral with and extending inwardly into the conduit for restricting the cross-sectional area of the conduit at each port whereby to establish a series of relatively high pressure zones throughout the length of that portion of the conduit having the ports therein, the longitudinal axes of the lips extending longitudinally of said conduit.

WILLIAM E. ANDERSON.

REFERENCES CITED

The following references are of record in the file of this patent:

UNITED STATES PATENTS

| Number | Name | Date |
| --- | --- | --- |
| 310,905 | Milbank | Jan. 20, 1885 |
| 1,307,365 | Kinyon | June 24, 1919 |
| 1,597,438 | Ennis | Aug. 24, 1926 |
| 1,610,358 | Caller | Dec. 14, 1926 |
| 1,730,195 | Davis | Oct. 1, 1929 |
| 2,303,810 | Anderson et al. | Dec. 1, 1942 |

FOREIGN PATENTS

| Number | Country | Date |
| --- | --- | --- |
| 482,313 | Great Britain | Mar. 28, 1938 |